United States Patent
Ranson et al.

(10) Patent No.: US 7,512,834 B2
(45) Date of Patent: Mar. 31, 2009

(54) APPARATUS, SYSTEM, AND METHOD FOR PROVIDING PARALLEL ACCESS TO A DATA SET CONFIGURED FOR AUTOMATIC RECOVERY

(75) Inventors: Karen Alicia Ranson, San Jose, CA (US); Donald Prentiss Terry, San Jose, CA (US); Gregory Walter Vance, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 539 days.

(21) Appl. No.: 11/017,284

(22) Filed: Dec. 20, 2004

(65) Prior Publication Data

US 2006/0156210 A1   Jul. 13, 2006

(51) Int. Cl.
*G06F 11/00* (2006.01)
(52) U.S. Cl. .............................................. 714/6; 714/7
(58) Field of Classification Search .................. 714/6–7
See application file for complete search history.

(56) References Cited

U.S. PATENT DOCUMENTS

| | | | |
|---|---|---|---|
| 6,061,769 A | 5/2000 | Kapulka et al. | 711/162 |
| 6,449,623 B1 | 9/2002 | Bohannon et al. | 707/202 |
| 6,604,160 B1 | 8/2003 | Le et al. | 710/240 |
| 6,732,123 B1 | 5/2004 | Moore et al. | 707/202 |
| 6,754,770 B2 * | 6/2004 | Kang et al. | 711/114 |
| 6,820,212 B2 * | 11/2004 | Duchesne et al. | 714/7 |
| 6,859,888 B2 * | 2/2005 | Furuya et al. | 714/6 |
| 7,062,673 B2 * | 6/2006 | Ng | 714/6 |
| 2003/0140183 A1 * | 7/2003 | Goode et al. | 710/6 |
| 2005/0005034 A1 * | 1/2005 | Johnson | 710/6 |
| 2006/0010107 A1 * | 1/2006 | Nguyen et al. | 707/3 |

OTHER PUBLICATIONS

Redundant Array of Independent Disks, Wikipedia, Jan. 14, 2004, http://web.archive.org/web/20040114164733/http://en.wikipedia.org/wiki/RAID#RAID_1:_Mirroring_and_Duplexing_(Mirrored).*
Copeland, G. et al., "A comparison of high-Availability media recovery techniques" ACM Digital Library, 1989.

* cited by examiner

*Primary Examiner*—Scott T. Baderman
*Assistant Examiner*—Jigar Patel
(74) *Attorney, Agent, or Firm*—Kunzler & McKenzie

(57) ABSTRACT

An apparatus, system, and method are disclosed for providing parallel access to a data set configured for automatic recovery. The apparatus includes an access module, a conversion module, a recovery module, and a restore module. The access module establishes parallel access to a data set configured for "pair and a spare" automatic recovery. The conversion module converts access to the data set from parallel access to single point access in response to an application instance detecting an error in the data set. The recovery module recovers the data set using an automatic recovery process initiated by the application instance that detects the error. The restore module restores access to the data set from single point access to parallel access in response to successful recovery of the data set. Providing parallel access to a data set configured for automatic recovery ensures that data transactions are performed swiftly, reliably, and efficiently.

19 Claims, 6 Drawing Sheets

APPARATUS, SYSTEM, AND METHOD FOR PROVIDING PARALLEL ACCESS TO A DATA SET CONFIGURED FOR AUTOMATIC RECOVERY

BACKGROUND OF THE INVENTION

1. Field of the Invention

This invention relates to data transactions and recovery, and more particularly relates to providing parallel access to a data set configured for automatic recovery.

2. Description of the Related Art

Application processing systems such as Information Management System (IMS®) from IBM of Armonk, N.Y. generally handle extremely important data. As a result, users of an IMS® often require rapid and uninterrupted access to highly reliable data. Consequently, IMS® systems are implemented with backup capabilities and with a redundant architecture. Users of the IMS® data typically include executable computer applications.

In the current implementation of an application processing system, a critical data set can be accessed by multiple systems. There is typically a component in each system that manages the data set and processes requests from other components. Processing of these requests involves one or more accesses to the data set to read or update the data. As commonly implemented, access to the data set is serialized such that one system has exclusive access to the data set at a time while processing a request.

One architecture typically implemented for greater reliability in serialized access systems includes two physical data sets and a third spare data set ('a pair and a spare' architecture). Software duplexing is used to maintain the two data sets as active dual copies of the same logical data. In the event of a media failure on one of the two active physical data sets, the failed data set is removed from the physical data set configuration and the remaining active data set is copied into the spare to maintain dual data sets. A request is then made of an administrator to create a new spare data set. Alternatively, the new spare data set is generated automatically. Typically, the recovery process can be performed automatically. Although the "pair and a spare" architecture is highly reliable, it is conventionally just implemented in serialized systems due to the many complexities involved in coordinating the recovery process while allowing multiple systems to access the data.

Although the "pair and a spare" architecture provides increased reliability, a bottleneck can be created between application instances constantly accessing the data set serially that hinders performance. To eliminate contention resulting from data set level serialization, it would be desirable to allow multiple systems to access the data set and process requests concurrently.

One solution implemented to allow parallel access to multiple application instances concurrently is implemented in a system using a data set backup and forward recovery logging. In a backup and forward recovery solution, multiple application instances may access the data set in parallel. However, if recovery is required, all access to the data set may be suspended while the backup data set is copied over and the forward recovery is implemented. Forward recovery logging is required to capture updates made to the data set between backup and time of failure. Implementation of this backup scheme requires that the data set be taken offline for the duration of the recovery. Additionally, typical systems require manual operation of the backup procedure. Recovery using backup and forward recovery can be prohibitively time consuming. The primary drawbacks of this system include increased system down time, and an inability to perform the recovery process automatically.

From the foregoing discussion, it should be apparent that a need exists for an apparatus, system, and method that provide parallel access to a data set configured for automatic recovery. Beneficially, such an apparatus, system, and method would overcome the many complexities of providing multiple systems access to a data set configured for high-speed automatic recovery and high availability. Information system reliability and performance will be increased without typical tradeoffs required by standard system architectures.

SUMMARY OF THE INVENTION

The present invention has been developed in response to the present state of the art, and in particular, in response to the problems and needs in the art that have not yet been fully solved by currently available information management systems. Accordingly, the present invention has been developed to provide an apparatus, system, and method for providing parallel access to a data set configured for automatic recovery that overcome many or all of the above-discussed shortcomings in the art.

The apparatus to provide parallel access to a data set configured for automatic recovery is provided with a logic unit containing a plurality of modules configured to functionally execute the necessary steps of establishing parallel access to a data set configured for a "pair and a spare" automatic recovery process, converting access to the data set from parallel access to single point access in response to an application instance detecting an error in the data set, recovering the data set using the automatic recovery process initiated by the application instance that detects the error, and restoring access to the data set from single point access to parallel access in response to successful automatic recovery of the data set. These modules in the described embodiments include an access module, a conversion module, a recovery module, and a restore module.

In one embodiment, the access module establishes parallel access to a data set configured for a "pair and a spare" automatic recovery process. Additionally, the apparatus may include a detect module configured to detect an error in the data set indirectly by examining return results from an intermediary application interfacing with the data set. In one embodiment, an application instance accessing the data set cancels an active transaction in response to encountering an error in the data set.

In one embodiment, the conversion module is configured to convert access to the data set from parallel access to single point access in response to an application instance detecting an error in the data set. The conversion module may include a quiesce module configured to quiesce transactions involving the data set by issuing a quiesce command to additional application instances accessing the data set to quiesce transactions with the data set and queuing the quiesce command for each application instance configured to use the data set such that active transactions are completed and other transactions are temporarily delayed while the quiesce command is active. Additionally, the conversion module may include a block module configured to block transactions from newly initiated application instances attempting to access the data set during the automatic recovery process.

In one embodiment, the recovery module recovers the data set using the automatic recovery process initiated by the application instance that detects the error. The recovery module may include an initiate module configured to initiate the automatic recovery process in response to acknowledgement of the quiesce command from each of the application instances configured to access the data set. In one embodiment, the automatic recovery process is a standard recovery process implemented on a "pair and a spare" data set architecture.

In one embodiment, the restore module restores access to the data set from single point access to parallel access in response to successful automatic recovery of the data set. The restore module may include a reestablish module configured to issue an end-quiesce command to application instances configured to use the data set, such that parallel access to the data set is reestablished. The restore module may also include a reissue module configured to reissue the cancelled transaction in response to successful automatic recovery of the data set.

A system of the present invention is also presented to provide parallel access to a data set configured for automatic recovery. In one embodiment, the system includes a recovery control (RECON) data set and a controller. The RECON data set may include a first data set configured to perform transactions with the interfacing application instances, a second data set configured to mirror the first data set for redundancy, and a spare data set configured to replace one of the first data set and the second data set in response to a failure. In one embodiment, the controller is configured to establish parallel access to a data set configured for a "pair and a spare" automatic recovery process, convert access to the data set from parallel access to single point access in response to an application instance detecting an error in the data set, recover the data set using the automatic recovery process initiated by the application instance that detects the error, and restore access to the data set from single point access to parallel access in response to successful automatic recovery of the data set.

A method of the present invention is also presented for providing parallel access to a data set configured for automatic recovery. The method in the disclosed embodiments substantially includes the steps necessary to carry out the functions presented above with respect to the operation of the described apparatus and system.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
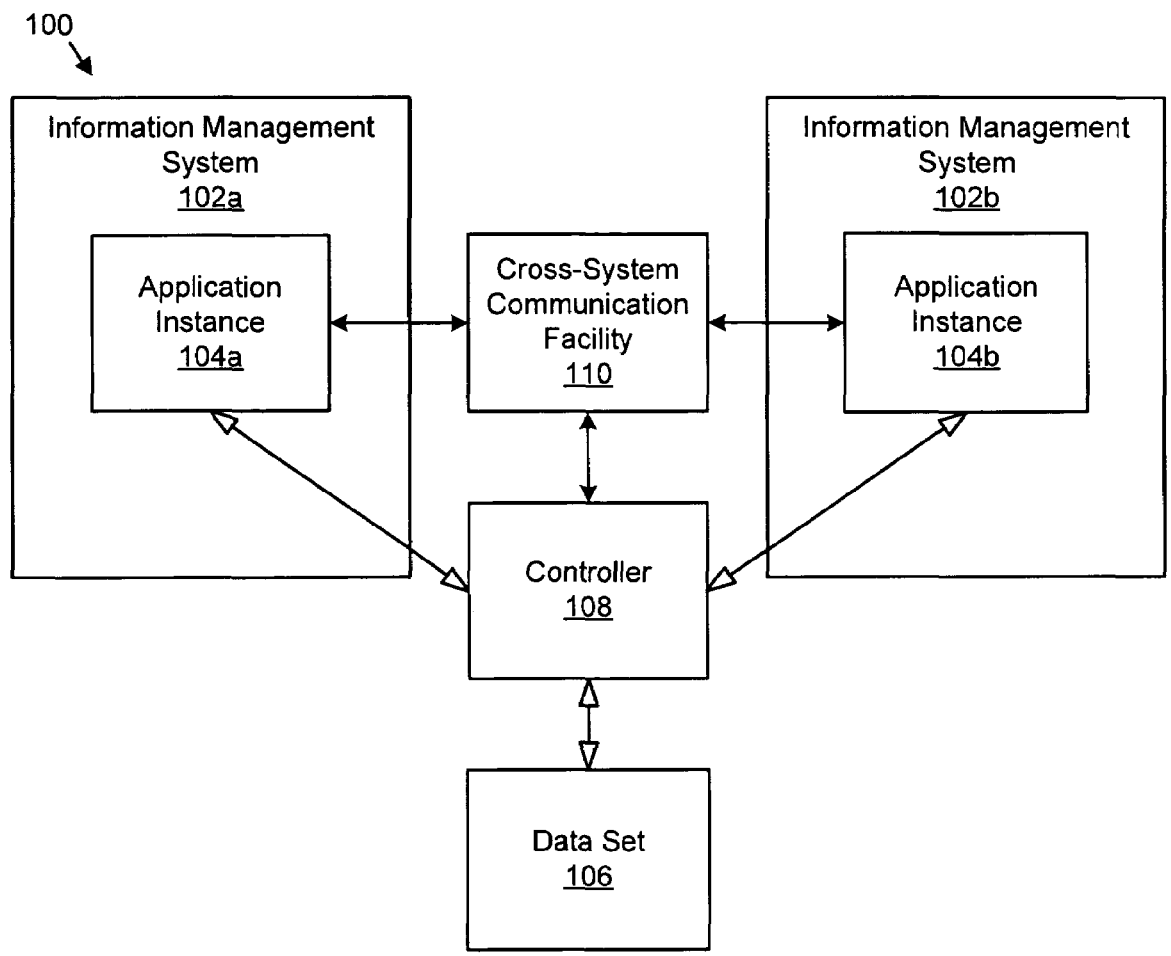
FIG. 1 is a schematic block diagram illustrating one embodiment of a system for providing parallel access to a data set configured for automatic recovery.

FIG. 1 depicts one embodiment of a system 100 for providing parallel access to a data set configured for automatic recovery. In one embodiment, the system 100 may include one or more Information Management Systems (IMS®) 102a-b including one or more application instances 104a-b, a data set 106, a controller 108, and a cross-system communication facility 110.

In one embodiment, the application instances 104a-b are Database Recovery Control (DBRC) facilities configured to provide access between the IMSs® 102a-b and the data set 106. Alternatively, a client application may access the data set 106 via the IMSs® 102a-b. The IMSs® 102a-b may host one or more executable application instances 104a-b requiring access to the data set 106. In one embodiment, the data set 106 may include a Recovery Control (RECON) data set. In one embodiment, the IMSs® 102a-b controls application instances 104a-b, wherein the controller 108 controls access to the RECON data set 106 by the application instances 104a-b. An application instance 104a-b may access a RECON data set 106 associated with one IMS® 102a-b via a networked connection including multiple IMS® 102a-b devices and optionally a sysplex device.

In one embodiment, the IMSs® 102a-b handles transactions between application instances 104a-b and data sets 106 managed by the IMSs® 102a-b. Application instances interfacing the IMSs® 102a-b may facilitate access between the IMSs® 102a-b and the RECON data set 106. In one embodiment, an application instance 104a is a process that runs on the IMSs® 102a-b. In various embodiments, the IMSs® 102a-b may additionally include a transaction manager, a database manager, a syncpoint manager, a resource manager, and the like.

In one embodiment, a RECON data set 106 contains data used by multiple applications. The data stored in the RECON data set 106 may be critical to functionality of interfacing application instances 104a-b. In one embodiment, a RECON data set 106 may include a first data set configured for use by application instances 104a-b, a second data set configured to actively mirror the first data set for redundancy, and a spare data set configured to replace either the first data set or the second data set in response to an I/O failure.

Other embodiments of a RECON data set 106 may exist. In one embodiment, the RECON data set 106 may be physically stored on a storage device external to the IMSs® 102a-b. Alternatively, the RECON data set 106 may be stored on a storage device internal to the IMSs® 102a-b. The RECON data set 106 is but one example of data sets 106 suitable for use with the present invention. Preferably, the data set 106 is configured to implement "a pair and a spare" data architecture.

In one embodiment, the controller 108 is configured to establish parallel access to a data set 106 configured for a "pair and a spare" automatic recovery process, convert access to the data set 106 from parallel access to single point access in response to an application instance 104a detecting an error in the data set 106, recover the data set 106 using an automatic recovery process, and restore access to the data set 106 from single point access to parallel access in response to successful automatic recovery of the data set 106. In one embodiment, components such as the cross-system communication facility 110, or components with similar functionality, may be included in modules of the controller 108 described further in relation to FIG. 2 and FIG. 3. Alternatively, the cross-system communication facility 110 may be separate and distinct from the controller 108. In alternative embodiments, the components of the controller 108 may be located on or managed by the application instances 104*a-b*.

The controller 108 may use a cross-system communication facility 110 to communicate commands and other information between modules of the controller 108 and the application instances 104*a-b*. The cross-system communication facility 110 may be separate from the IMSs® 102*a-b*. Alternatively, each IMS® 102*a-b* may include a cross-system communication facility 110. Consequently, the cross-system communication facility 110 may facilitate parallel access by the application instances 104*a-b* to the data set 106. In one embodiment, the controller 108 may issue a quiesce command to application instances 104*a-b* to temporarily terminate access to a failed data set using the cross-system communication facility 110. The cross-system communication facility 110 may additionally communicate an acknowledge quiesce command, an end quiesce command, and the like between application instances 104*a-b*, and the controller 108. In one embodiment, the cross-system communication facility is a standard inter-module command communication feature of the IMSs® 102*a-b*.

Figure 2:
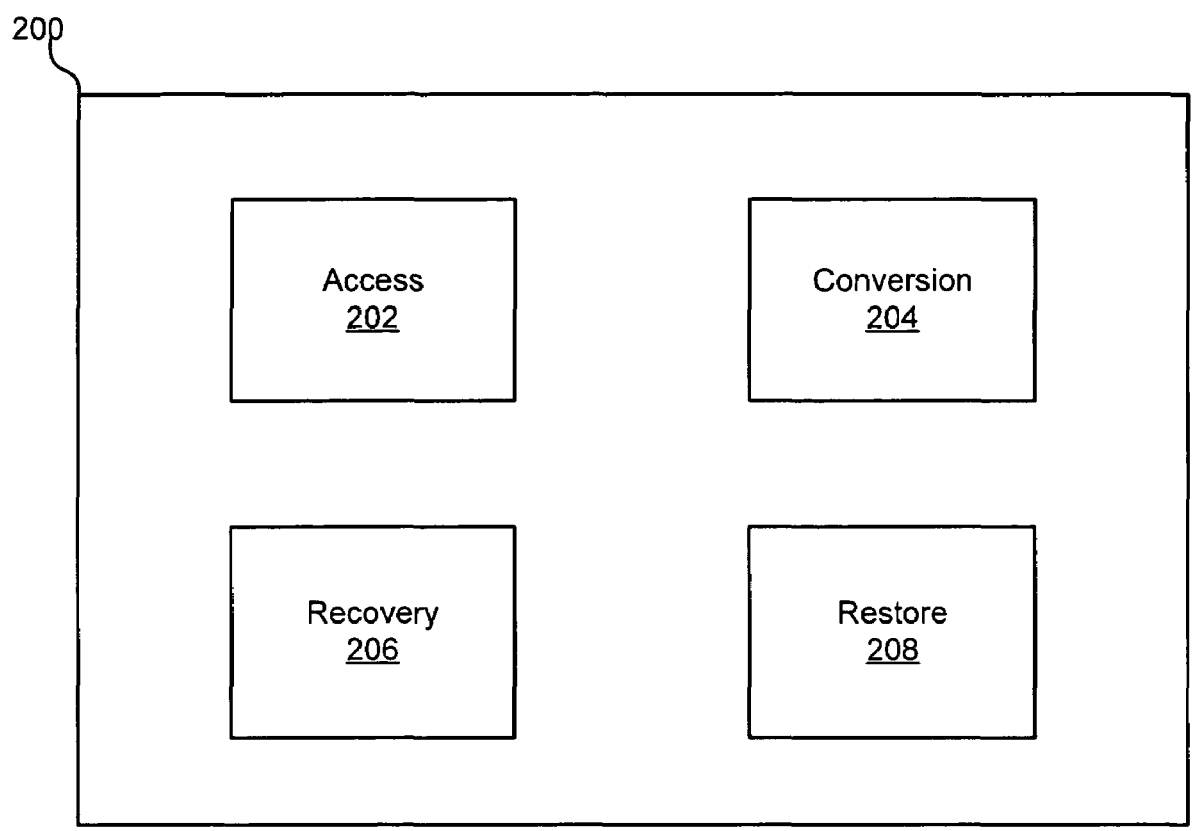
FIG. 2 is a schematic block diagram illustrating one embodiment of an apparatus for providing parallel access to a data set configured for automatic recovery.

FIG. 2 illustrates one embodiment of an apparatus 200 to provide parallel access to a data set 106 configured for automatic recovery. In one embodiment, the apparatus 200 includes an access module 202, a conversion module 204, a recovery module 206, and a restore module 208. The apparatus 200 may control access to the RECON data set 106 on the IMSs® 102*a-b*.

In one embodiment the access module 202 is configured to establish parallel access to a data set 106 configured for a "pair and a spare" automatic recovery process. The access module 202 may establish parallel access primarily to the first data set. For example, the access module 202 may use a transaction manager, a syncpoint manager, or the like to connect multiple application instances 104*a-b* to the data set 106 creating multiple access points to the data set 106. Each access point is capable of handling data transactions between the data set 106 and the application instances 104*a-b*. In one embodiment, the application instances 104*a-b* may access the data set 106 using a common data bus.

In one embodiment the conversion module 204 is configured to convert access to the data set 106 from parallel access to single point access in response to an application instance 104*a* detecting an error in the data set 106. The conversion module 204 converts access to the data set 106 to single point access to avoid data inconsistencies during the automatic recovery process. In one embodiment, the conversion module 204 converts access to the first data set only, allowing continued parallel access to the second data set while the first data set is recovered. Alternatively, serial access is provided to the whole data set 106 during the automatic recovery process. Such embodiments provide continuous access between the application instances 104*a-b* and the data set 106. Consequently, the data set 106 may be recovered in such a way that the operation is transparent to user applications.

In one embodiment, the recovery module 206 is configured to recover the data set 106 using the automatic recovery process initiated by the application instance 104*a* that detected the error. The automatic recovery process as implemented on a "pair and a spare" architecture is commonly known in the art. In the case of a failure in the first data set, steps of the automatic recovery process may include deactivating the first data set, copying valid data from the second data set to the spare data set, and activating the spare data set in place of the first data set. While recovery is occurring, the conversion module 204 maintains at least serial access to the data set 106.

In one embodiment, the restore module 208 is configured to restore access to the data set 106 from single point access to parallel access in response to successful automatic recovery of the data set 106. In one embodiment, the restore module 208 may issue an end-quiesce command to application instances 104*a-b* previously accessing the data set 106 using the cross-system communication facility 110. The end-quiesce command may trigger application instances 104*a-b* to resume transactions previously queued for the data set 106. In certain embodiments, the restore module 208 restores access to the first data set or the second data set to parallel access in response to successful recovery of the respective data set.

Figure 3:
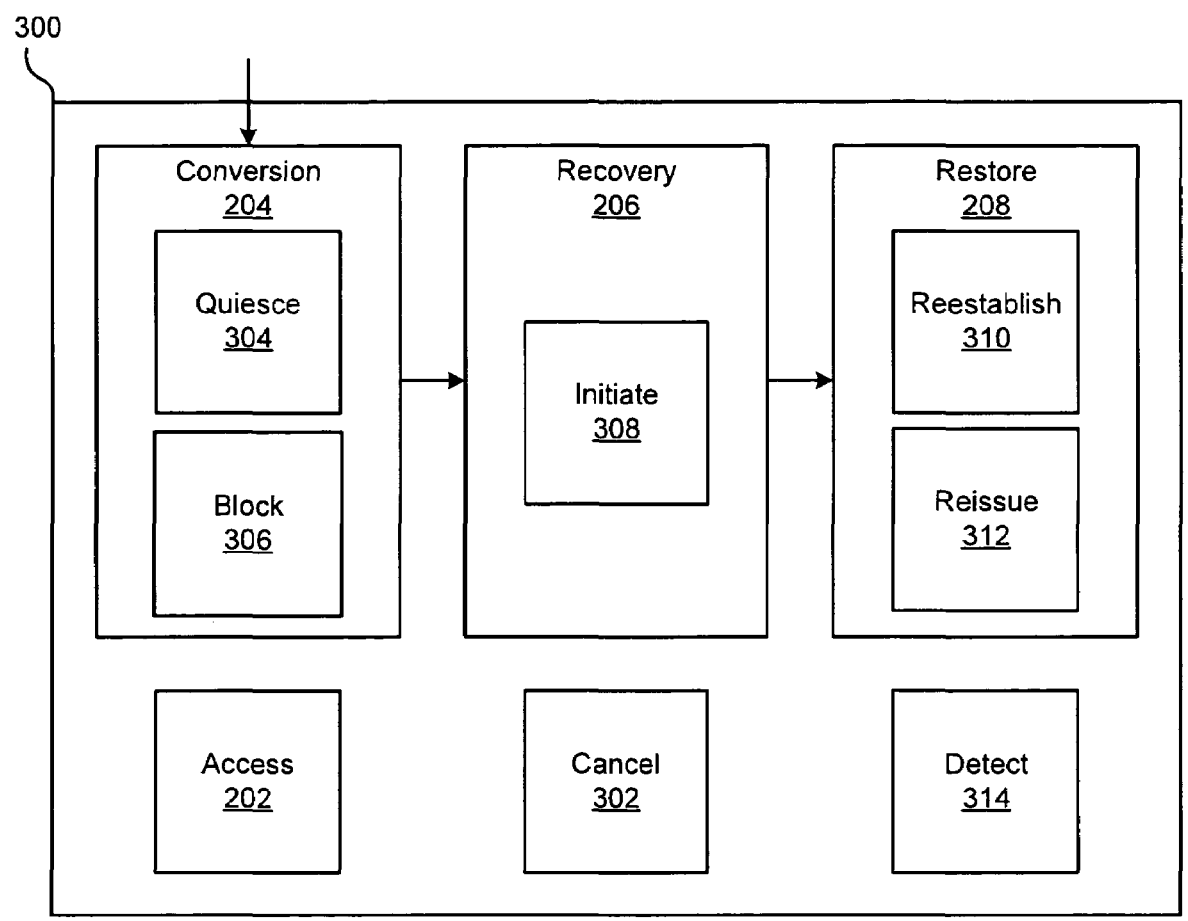
FIG. 3 is a detailed schematic block diagram illustrating one embodiment of an apparatus for providing parallel access to a data set configured for automatic recovery.

FIG. 3 illustrates another embodiment of an apparatus 300 for providing parallel access to a data set configured for automatic recovery. The apparatus 300 may include the access module 202, the conversion module 204, the recovery module 206, and the restore module 208 as described in relation to FIG. 2. Additionally, the apparatus 300 may include a cancel module 302, a quiesce module 304, a block module 306, an initiate module 308, a reestablish module 310, a reissue module 312, and a detect module 314.

In one embodiment, the access module 202 establishes initial parallel access to the data set, and then does not perform other tasks until the system is reinitialized. If an error in the data set 106 is encountered, the conversion module 204 may take initial action by taking control of the data set 106 and the application instances 104*a-b*. Next, the recovery module 206 performs the automatic recovery process. Finally, the restore module 208 reestablishes parallel access to the data set 106. In an alternative embodiment, the reestablish module 310 may request that the access module 202 reestablish parallel access to the data set 106. Alternatively, the modules may be distributed among components of the IMSs® 102*a-b* including the application instances 104*a-b*, the cross-communication facility 110, and the like.

In one embodiment, the cancel module 302 cancels an active transaction in response to encountering an error on the data set. The cancel module 302 may actively cancel the transaction. Alternatively, the application instance 104*a* accessing the data set 106 may cancel the active transactions. For example, the application instance 104*a* that encounters the error may make a back out request to the syncpoint manager which backs out the active transaction and maintains a record of the backed out transaction.

In one embodiment, the conversion module 204 includes a quiesce module 304. The quiesce module 304 may facilitate conversion of access to the data set 106 from parallel access to serial access. The quiesce module 304 may issue a quiesce command to application instances 104*a-b* accessing the data set 106 in response to detection of an error in the data set 106. Alternatively, the quiesce command may be sent by the application instance 104*a* that first detects an error on the data set 106. In one embodiment, the quiesce command is sent via a cross-system communications facility 110. The quiesce command may be queued by the application instances 104*a-b* waiting to complete active transactions. When the quiesce command is recognized, that application instance 104*b* sets a 'quiesced' status for the data set and sends an acknowledgement back to the application instance 104*a* that issued the quiesce command. Once the quiesced status is set, processing of any new transactions that would access the data set waits until the quiesced status has been cancelled.

In certain scenarios, multiple application instances 104a-b may encounter an error on the data set simultaneously. One possessing common skill in the art is familiar with a wide variety of race condition protocols which may be implemented by the conversion module 204 in such instances to determine the application instance 104a that will initiate the quiesce command and recovery process.

In one embodiment, the conversion module includes a block module 306 configured to block transactions from new application instances 104a-b attempting to access the data set 106 during the automatic recovery process. The cross-system communications facility 110 allows each of the application instances 104a-b to know about the existence of, and to communicate with, other application instances 104a-b. When a new application instance 104b initializes, the application instance 104b must receive verification that the data set is not blocked or quiesced. In one embodiment, the application instance 104b interacts with the blocking module 306 for verification. Alternatively, the application instance 104b may receive verification from another application instance 104a accessing the data set 106.

In one embodiment, the recovery module 206 includes an initiate module 308. When an application instance 104a encounters an error and has received acknowledgements of quiesced access from other application instances 104a-b, the initiate module 308 initiates the automatic recovery process. In one embodiment, the initiate module 308 may initiate the automatic recovery process in response to a trigger or action taken by the application instance 104a that encountered the error.

In one embodiment, the restore module 208 includes a reestablish module 310. The reestablish module 310 may send an end-quiesce command to the other application instances 104a-b when the automatic recovery process is complete. In one embodiment, the restore module 208 may receive notification from the automatic recovery process by the recovery module 206 that recovery has been successfully completed. For example, the automatic recovery process may send return codes indicating status of the recovery process to the restore module 208. The reestablish module 310 additionally ensures that the application instances 104a-b resume access to the data set using the same physical data sets and the same configurations. The end-quiesce notification command may include new physical data set configuration information. Reestablishing accurate configuration policies reduces risk of data inconsistency arising from unauthorized access to the first data set or the second data set subsequent to recovery of the data set 106.

In one embodiment, the restore module 208 additionally includes a reissue module 312. The reissue module 312 may reissue application transactions and other tasks performed on the data set 106 that were cancelled when an error was encountered on the data set 106. The reissue module 312 may reissue the transactions when the reestablish module 310 signals successful reestablishment of parallel access to the data set 106.

In one embodiment, the detect module 314 detects an error in the data set 106 indirectly by examining return results from an intermediary application interfacing with the data set 106. For example, when an application instance 104a makes a read or update access request to the resource manager, the application instance 104a determines from the return codes of the resource manager if an error was encountered. In one embodiment, the resource manager may handle commit, backout, modify, and other like operations on the data set 106. These operations may physically implement any changes the application instances 104a-b make logically to the data set 106.

In another example, the application instance 104a makes a backout request to the syncpoint manager. The syncpoint manager then directs the resource manager to backout uncommitted updates made by the application instance 104a. In such an example, the application did not make a direct request to the resource manager so it cannot check resource manager return codes to determine if an error occurred. However, based on the status of the backout request, as indicated by the return code from the resource manager, the application instance 104a may determine the status of the two physical data sets to determine if an error occurred. Thus, the detect module 314 may determine by inspection of the return codes that an error has occurred on the data set 106 without encountering the error directly.

Figure 4:
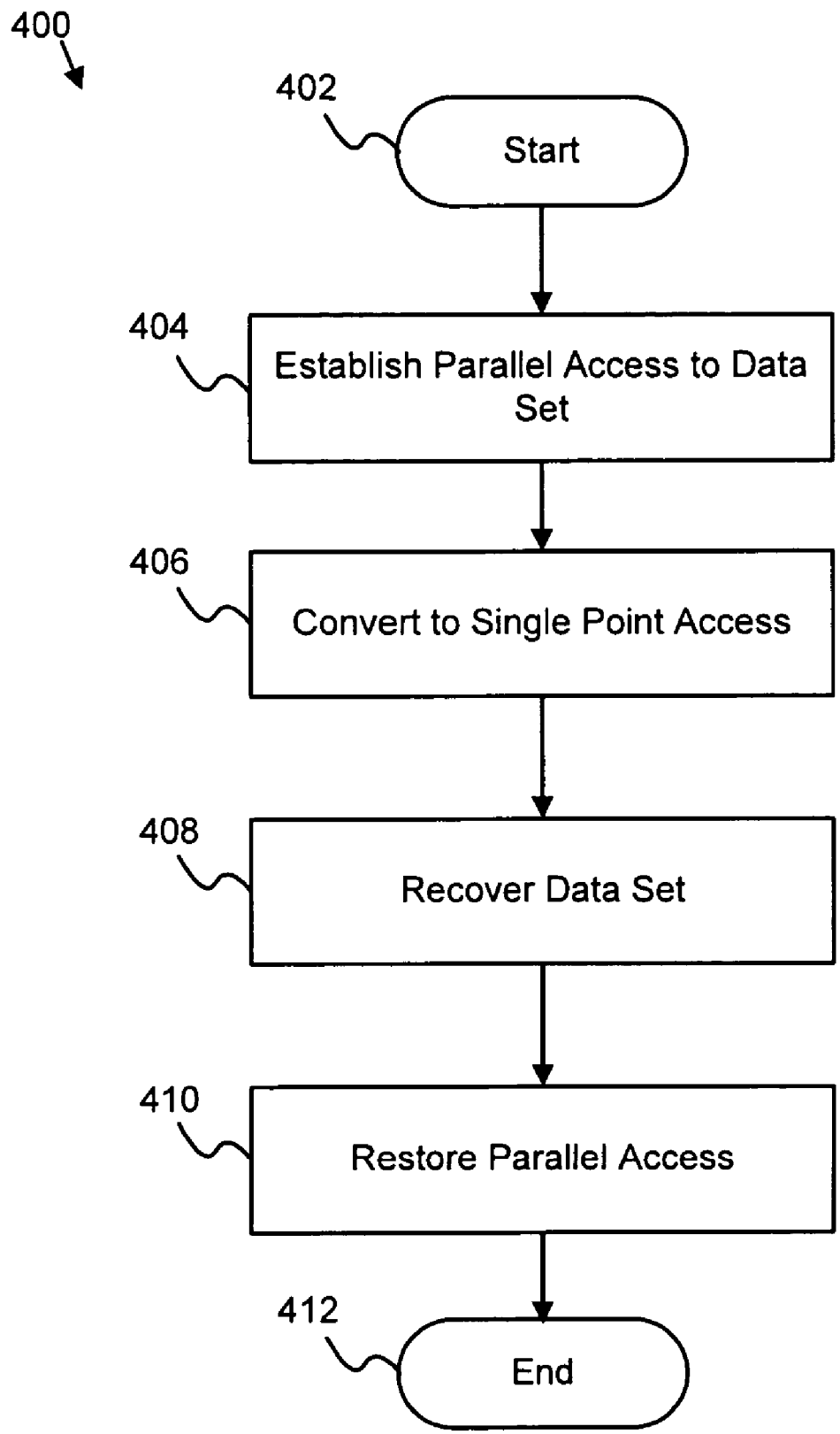
FIG. 4 is a schematic flow chart diagram illustrating one embodiment of a method for providing parallel access to a data set configured for automatic recovery.

FIG. 4 illustrates one embodiment of a method 400 for providing parallel access to a data set configured for automatic recovery. In one embodiment, the method 400 starts 402 when the access module 202 establishes 404 parallel access to the data set 106. For example, a sync-point manager or transaction manager may create a connection between the application instances 104a-b and the data set 106. In the event that an error occurs on the data set 106, the conversion module 204 converts 406 access to the data set 106 from parallel access to single point access. Next, the recovery module 206 recovers 408 the data set using an automatic recovery process. When the automatic recovery process successfully completes recovery of the data set 106, the restore module 208 restores 410 access to the data set 106 to parallel access and the method 400 ends 412.

For example, the access module 202 may establish parallel access for banking applications to a data set 106 containing account information. If an error is encountered by one of the banking application instances 104a-b referencing the data set 106, the conversion module 406 may convert access to the data set 106 from parallel access to single point access. The recovery module 206 may then initiate the automatic recovery process which recovers 408 the data set 106. When the data set 106 has been successfully recovered, the restore module 208 may restore parallel access to the data set 106. In an alternative example, the access module 202, the conversion module 204, the recovery module 206, and the restore module 208 may perform the operations described above on either the first or the second data set.

Figure 5:
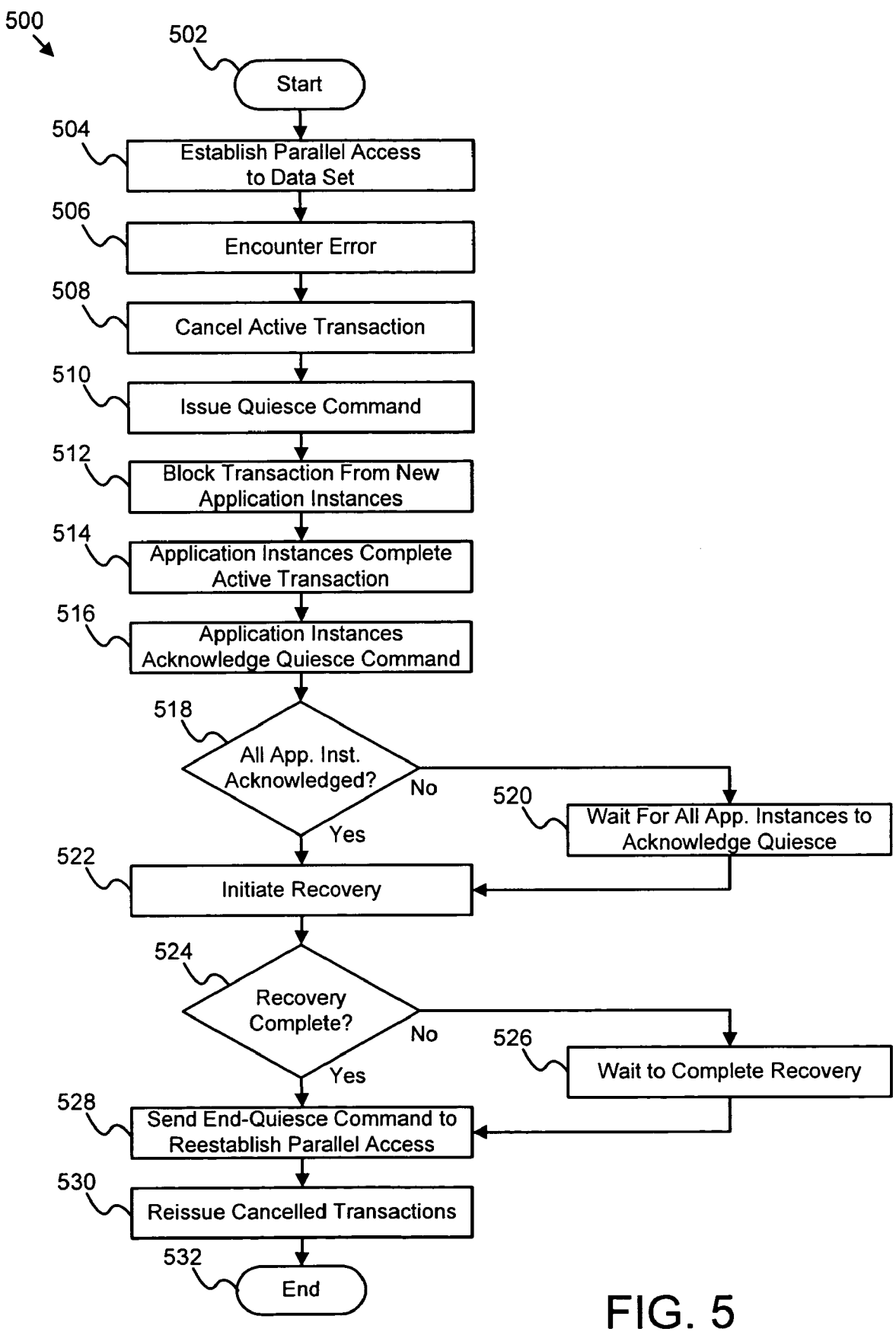
FIG. 5 is a detailed schematic flow chart diagram illustrating one embodiment of a method for providing parallel access to a data set configured for automatic recovery.

FIG. 5 illustrates one embodiment of a method 500 for providing parallel access to a data set configured for automatic recovery. In one embodiment, the method 500 starts 502 when the access module establishes 504 parallel access to the data set 106. If an application instance 104a encounters 506 an error in the data set 106, the cancel module 302 cancels 508 an active transaction for the application instance 104a that encountered 506 the error. The quiesce module 304 then issues 510 a quiesce command to other application instances 104a-b registered to access the data set 106. In an alternative embodiment, the application process that encountered 506 the error issues 510 the quiesce command to other application instances 104a-b referencing the data set 106 using a cross-system communications facility 110. In one embodiment, the quiesce command is queued by the application instances 104a-b in a work queue.

Once the quiesce module 304 issues 510 the quiesce command, the block module 306 may block 512 transactions from newly started application instances. Active application instances 104a-b complete 514 active transactions within their queue until the quiesce command is recognized. The application instances 104a-b then acknowledge 516 the quiesce command and stop further transactions with the specified data set 106. If each of the application instances 104a-b has acknowledged 518 the quiesce command, the initiate module 308 initiates 522 the automatic recovery process. If application instances 104a-b have not acknowledged 518 the quiesce command, the initiate module 308 waits 520 until each of the application instances 104a-b have acknowledged the quiesce command. If recovery is complete 524, then the reestablish module 310 sends 528 an end-quiesce command. If the recovery process is not complete 524, the reestablish module 310 waits 526 for the recovery process to complete before sending 528 the end-quiesce command to reestablish parallel access to the data set 106. Once parallel access is reestablished, the reissue module 312 may reissue 530 transactions previously cancelled 508 by the cancel module 302, and the method 500 ends 532.

Figure 6:
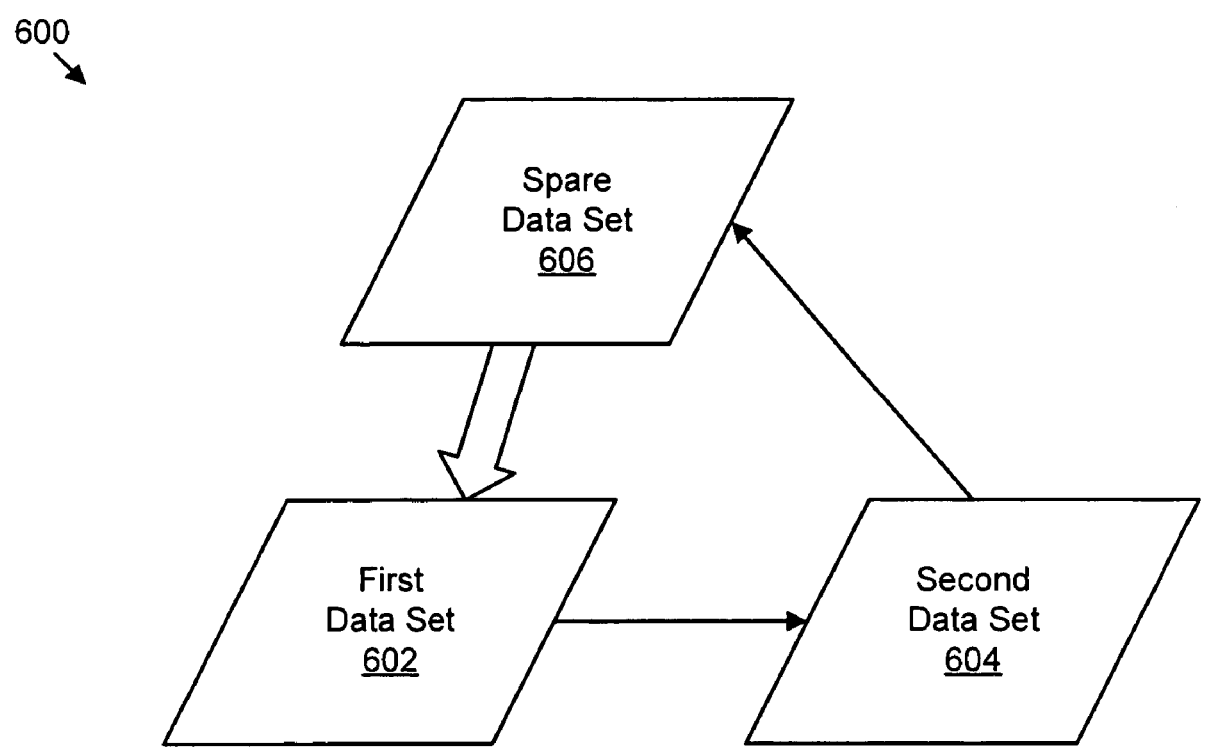
FIG. 6 is a schematic block diagram illustrating one embodiment of a data set configured for automatic recovery.

FIG. 6 illustrates one embodiment of a data set 600 architecture configured for automatic recovery. In one embodiment, the data set 600 may include a first data set 602, a second data set 604, and a spare data set 606. This configuration is commonly referred to at "a pair and a spare". In one embodiment, the first data set 602 and the second data set 604 are active data sets. The first data set 602 may be the primary transaction data set, and the second data set 604 may mirror the first data set 602. Alternatively, the first data set 602 and the second data set 604 may processes transactions for multiple application instances 104a-b concurrently.

If an error occurs on the first data set 602, that data set 602 is deactivated. In one embodiment, a logical pointer to the failed data set 602 is routed to a new address. Alternatively, the failed data set 602 may be deleted, moved, overwritten, or the like. Valid data from the second data set 604 is then copied to the spare data set 606. The spare data set 606 is then placed online by routing a logical pointer to the address of the spare data set 606, copying the data set, moving the data set, or the like. In certain embodiments, similar actions may be taken with respect to the second data set 604 if an error occurs on the second data set 604.

Beneficially, the apparatus, system, and method described above increase data set reliability, availability, and consistency. Moreover, one major advantage derived from implementation of the present invention is customer satisfaction, parallel access is provided in conjunction with a "pair and a spare" data set recovery protection. These innovative additions to the art of information management help to ensure that highly sensitive and valuable data can be readily accessible and extremely accurate. Implementation of the "pair and a spare" architecture provides high availability and reliability. Providing parallel access to the "pair and a spare" data set 106 adds additional availability by reducing bottlenecks associated with serial data access.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

The schematic flow chart diagrams included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to provide parallel access to recovery control ("RECON") data set configured for automatic recovery, the apparatus comprising:
   a database server comprising a processor and a memory device, configured to store executable and operational data, the memory device comprising:
      an access module configured to establish parallel access to a recovery control ("RECON") data set, the data set configured for a "pair and a spare" automatic recovery process, the RECON data set having a first data set, a second data set, and a spare data set, the parallel access established through multiple access points to the RECON data set, each access point handling transactions between one or more distinct application instances and the first data set in the RECON data set such that the application instances perform multiple reads from the first data set, the access module mirroring updates of the first data set to the second data set;
      a conversion module configured to actively convert access to the first data set from parallel access to single point access in response to an application instance detecting an error in the first data set, the conversion module issuing a quiesce command to the application instances configured to access the failed first data set, and queuing the quiesce command for each application instance configured to use the failed first data set such that pending transactions are completed and additional transactions that use the failed first data set are halted, the conversion module re-routing a logical pointer pointing to the failed first data set to a new address of a non-failed data set, the non-failed data set comprising one of the datasets of the RECON data set that has not failed, and reassigning the non-failed data set to become the first data set and the first data set to become one of the spare data set and the second data set;
      a recovery module configured to recover the failed data set of the RECON dataset using the automatic recovery process initiated by the application instance that detects the error; and
      a restore module configured to restore access to the failed data set from single point access to parallel access in response to successful automatic recovery of the failed data set.

2. The apparatus of claim 1, wherein an application instance accessing the RECON data set cancels an active transaction in response to encountering an error in the data set.

3. The apparatus of claim 2, wherein the restore module further comprises a reissue module configured to reissue the canceled transaction in response to successful automatic recovery of the failed data set.

4. The apparatus of claim 1, wherein the recovery module further comprises:
   an initiate module configured to initiate an automatic data set recovery in response to acknowledgement of the quiesce command from each of the application instances configured to access the failed data set; and
   a blocking module configured to block transactions from newly started application instances from accessing the failed data set of the RECON dataset.

5. The apparatus of claim 1, wherein the automatic recovery process further comprises a standard recovery process implemented on a "pair and a spare" data set architecture.

6. The apparatus of claim 1, wherein the restore module further comprises a reestablish module configured to issue an end-quiesce command to application instances configured to use the failed data set, such that parallel access to the data set is reestablished.

7. The apparatus of claim 1, further comprising a detect module configured to detect an error in one of the three data sets indirectly by examining return results from intermediary applications accessing the data set.

8. A system to provide parallel access to data sets configured for automatic recover, the system comprising:
   a recovery control ("RECON") data set consisting of:
      a first data set configured for use by application instances;
      a second data set configured to actively mirror data of the first data set;
      a spare data set configured to replace one of the first data set and the second data set in response to a failure;
      wherein the first data set, second data set, and third data set are within the RECON data set, and
   a cross-system communication facility configured to facilitate cross-system communication between a plurality of application instances and the RECON data set; and
   a controller configured to:
      establish parallel access between the plurality of application instances and any one of the RECON data sets through interaction with the cross-system communications facility, the parallel access established through multiple access points to the RECON data sets, each access point handling transactions between a distinct application instance and the data set such that the application instances can do multiple reads from the same data set, the access module mirroring updates on the first data set to the second data set;
      actively convert access to one of the three or more data sets from parallel access to single point access in response to an application instance detecting an error in one of the three or more data sets by re-routing a logical pointer pointing to the failed data set to a new address of one of a non-failed data set such that the logical pointer points to a non-failed data set, the non-failed dataset comprising one of the datasets of the RECON dataset that has not failed;
      recover the failed data set of the RECON dataset using the automatic recovery process initiated by the application instance that detects the error; and
      restore access to the failed data set from single point access to parallel access in response to successful automatic recovery of the failed data set.

9. The system of claim 8, wherein an application instance accessing one of the RECON data set cancels an active transaction and queues a quiesce command for each application instance configured to use one of the RECON data set such that pending transactions are completed and additional transactions are temporarily halted while the quiesce command is active in response to encountering an error in the RECON data set.

10. The system of claim 9, wherein the controller is further configured to initiate a standard automatic recovery process on the RECON data set in response to acknowledgement of the quiesce command from each of the application instances configured to access the RECON data set.

11. The system of claim 9, wherein the controller is further configured to issue an end-quiesce command to application instances configured to use the RECON data set, such that parallel access to the RECON data set is reestablished and reissue the cancelled transaction in response to successful automatic recovery of the RECON data set.

12. The system of claim 8, wherein the controller is further configured to detect an error in the RECON data set indirectly by examining return results from intermediary applications accessing the RECON data set.

13. A computer program product comprising a computer readable medium having computer usable program code executable to provide parallel access to data sets configured for automatic recovery, the operations comprising:

an operation to establish parallel access to any one of the three or more data sets configured for a "pair and a spare" automatic recovery process, the parallel access established through multiple access points to one of the three or more data sets, each access point handling transactions between a distinct application instance and the data set such that the application instances can do multiple reads from the same data set, the access module mirroring updates on the first data set to the second data set;

an operation to actively convert access to one of the three or more data sets from parallel access to single point access in response to an application instance detecting an error in one of the three or more data sets by re-routing a logical pointer pointing to a failed data set to a new address of one of the non-failed three or more data sets such that the logical pointer points to a non-failed data set, where in the operation to convert further comprises operations to quiesce transactions comprising:

an operation to issue a quiesce command to other application instances configured to access the failed data set;

an operation to queue the quiesce command for each application instance configured to use the failed data set such that pending transactions are completed and additional transactions are temporarily halted while the quiesce command is active; and an operation to block transactions from newly initiated application instances;

an operation to recover the failed data set using the automatic recovery process initiated by the application instance that detects the error; and an operation to restore access to the failed data set from single point access to parallel access in response to successful automatic recovery of the failed data set.

14. The computer program product of claim 13, further comprising an operation to cancel an active transaction in response to an application instance encountering an error in the data set.

15. The computer program product of claim 13, wherein the operation to recover further comprises an operation to initiate an automatic data set recovery process in response to acknowledgement of the quiesce command from each of the application instances configured to access the failed data set.

16. The computer program product of claim 13, wherein the operation to restore further comprises an operation to issue an end-quiesce command to application instances configured to use the failed data set, such that parallel access to the data set is reestablished, and an operation to reissue a cancelled transaction in response to successful automatic recovery of the data set.

17. The computer program product of claim 13, wherein the operations further comprise an operation to detect an error in the data set indirectly by examining return results from intermediary applications accessing the data set.

18. The apparatus of claim 1, further comprising a cancel module configured to cancel an active transaction in response to encountering an error in the RECON data set.

19. The apparatus of claim 1, wherein the conversion module converts access to the RECON data set in response to a detect module detecting an error indirectly by examining return results from an intermediary application interfacing with the RECON data set.

* * * * *